(12) United States Patent
Pfaff (10) Patent No.: US 8,256,739 B2
(45) Date of Patent: Sep. 4, 2012

(54) POPPET VALVE OPERATED BY AN ELECTROHYDRAULIC POPPET PILOT VALVE

(75) Inventor: Joseph L. Pfaff, Wauwatosa, WI (US)

(73) Assignee: Husco International, Inc., Waukehsa, WI (US)

( * ) Notice: Subject to any disclaimer, the term of this patent is extended or adjusted under 35 U.S.C. 154(b) by 453 days.

(21) Appl. No.: 12/619,204

(22) Filed: Nov. 16, 2009

(65) Prior Publication Data

US 2010/0155633 A1    Jun. 24, 2010

Related U.S. Application Data

(60) Provisional application No. 61/139,655, filed on Dec. 22, 2008.

(51) Int. Cl.
*F16K 31/12* (2006.01)
(52) U.S. Cl. ............ 251/29; 251/30.02; 251/30.03
(58) Field of Classification Search ........... 251/30.01, 251/30.03, 30.04, 30.05, 33, 34, 35, 36, 38, 251/29, 120–123; 137/102, 269
See application file for complete search history.

(56) References Cited

U.S. PATENT DOCUMENTS

| | | | |
|---|---|---|---|
| 1,055,161 A * | 3/1913 | Geissinger | 251/34 |
| 3,221,767 A * | 12/1965 | McCarty et al. | 137/577 |
| 4,535,805 A | 8/1985 | Mertz | |
| 4,535,809 A | 8/1985 | Andersson | |
| 4,592,533 A * | 6/1986 | Guglielmi et al. | 251/30.01 |
| 4,662,601 A | 5/1987 | Andersson | |
| 4,699,351 A * | 10/1987 | Wells | 251/29 |
| 4,905,959 A | 3/1990 | Andersson | |
| 4,964,611 A | 10/1990 | Andersson | |
| 5,170,692 A * | 12/1992 | Lonnemo | 91/461 |
| 5,331,883 A | 7/1994 | Andersson | |
| 6,149,124 A | 11/2000 | Yang | |
| 6,398,182 B1 | 6/2002 | Stephenson | |
| 6,745,992 B2 | 6/2004 | Yang et al. | |
| 7,028,975 B2 * | 4/2006 | Lee et al. | 251/26 |

(Continued)

OTHER PUBLICATIONS

Yao, et al.; Energy-Saving Adaptive Robust Motion Control of Single-Rod Hydraulic Cylinders with Programmable Valves; Proceedings of the American Control Conference; Anchorage, AK; May 8-10, 2002; pp. 4819-4824.

(Continued)

*Primary Examiner* — John K Fristoe, Jr.
*Assistant Examiner* — Time Aigbe
(74) *Attorney, Agent, or Firm* — Quarles & Brady LLP; George E. Haas (57) ABSTRACT

A control valve includes a main poppet that moves in response to pressure in a primary control chamber and thereby controls the flow of fluid through a valve seat between first and second ports. A passageway extends between the second port and the primary control chamber and includes a variable flow restriction that decreases as the main poppet moves away from the valve seat. An electrohydraulic pilot valve has a pilot poppet which controls fluid flow from the primary control chamber to the first port in response to pressure in a pilot control chamber. A sub-pilot valve selectively releases pressure in the pilot control chamber to operate the pilot poppet to open and close a path between the inlet and the outlet. Using an electrohydraulic pilot valve enables the main poppet to operate quickly in controlling large fluid flow rates. Unidirectional and bidirectional versions of the control valve are described.

24 Claims, 4 Drawing Sheets

U.S. PATENT DOCUMENTS

| | | | |
|---|---|---|---|
| 7,240,604 B2* | 7/2007 | Smith et al. | 91/454 |
| 7,258,058 B2 | 8/2007 | Smith et al. | |
| 7,341,236 B2 | 3/2008 | Stephenson et al. | |
| 7,984,890 B2* | 7/2011 | Pfaff et al. | 251/30.04 |
| 2005/0077490 A1* | 4/2005 | Kah et al. | 251/30.01 |
| 2006/0043323 A1* | 3/2006 | Wang et al. | 251/30.01 |
| 2007/0210270 A1* | 9/2007 | Stephenson et al. | 251/38 |
| 2007/0290152 A1* | 12/2007 | Ma et al. | 251/30.01 |

OTHER PUBLICATIONS

Yao, et al.; Energy-Saving Control of Hydraulic Systems with Novel Programmable Valves; Proceedings of the 4th World Congress on Intelligent Control and Automation; Jun. 10-14, 2002; Shanghai, P.R. China; pp. 3219-3223.

Eaton; EPV16 Series Valvistor® Proportional Flow Controls; Vickers Proportional Valves; Oct. 1999.

* cited by examiner

POPPET VALVE OPERATED BY AN ELECTROHYDRAULIC POPPET PILOT VALVE

CROSS-REFERENCE TO RELATED APPLICATIONS

This application claims benefit of U.S. Provisional Patent Application No. 61/139,655 filed on Dec. 22, 2008.

STATEMENT REGARDING FEDERALLY SPONSORED RESEARCH OR DEVELOPMENT

Not Applicable

BACKGROUND OF THE INVENTION

1. Field of the Invention

The present invention relates to a pilot operated hydraulic valves and more particularly to electrically operated pilot valves.

2. Description of the Related Art

A wide variety of machines have moveable components which are operated by an hydraulic actuator, such as a cylinder and piston arrangement, that is controlled by a hydraulic valve. Traditionally, the hydraulic valve was manually operated by the machine operator. There is a present trend away from manually operated hydraulic valves toward electrical controls and the use of solenoid valves.

Application of pressurized hydraulic fluid from a pump to the actuator can be controlled by a set of proportional pilot operated control valves arranged in a Wheatstone bridge to meter fluid flow into and out of the hydraulic cylinder, as shown in U.S. Pat. No. 6,149,124. Each control valve has a poppet that engages and disengages a valve seat to control the fluid flow between the inlet and outlet of the valve. A control chamber is formed on the remote side of the poppet from the valve seat and a control passage is provided between the inlet and the control chamber. The greater pressure from the inlet, that is applied to the control chamber, holds the poppet against the valve seat because of lower pressure at the outlet. An integral solenoid operated pilot valve is activated when it is desired to open the control valve by moving the poppet away from the valve seat. Pilot valve activation opens a pilot passage releasing pressure in the control chamber into the outlet, thereby allowing the poppet to move away from a valve seat. Closing the pilot valve and thus the pilot passage causes pressure in the control chamber to increase, forcing the poppet to close against the valve seat.

Therefore, a relatively small force, applied by the solenoid to the pilot valve, is able to operate a poppet on which a significantly greater force acts due to pressure from the supply pump or the hydraulic actuator.

The functionality of this type of electrohydraulic valve is limited to a relationship between the solenoid force and control chamber flow. While a smaller control chamber flow is still sufficient to position a substantially larger poppet, the speed of the poppet decreases rapidly with increases in poppet size. Another drawback is that the stroke of the poppet is incrementally less than the stroke of the solenoid. It is desirable that the solenoid provide both high force and a large stroke (to achieve large poppet strokes), thus the solenoid mechanism greatly constrains the scalability of this type of electrohydraulic valve.

One solution that has been attempted to achieve high flow and rapid response time placed a large variable orifice, that was proportional to the poppet stroke, in the control passage between the inlet and the control chamber. The pilot valve vented the control chamber pressure to the low pressure outlet port through either a balanced pilot or a spool valve. This valve design was relatively fast and proportional, but because of the high flows in the control chamber through the relatively large control passage orifice, additional pressure compensators were required to scale the valve to larger sizes. In addition, enlarging the control orifice resulted in a non-linear relationship between the fluid pressure and flow and the electric current applied to the solenoid, which non-linear relationship adversely affected accurate control.

Therefore, a need still exists for an electrohydraulic poppet valve that can rapidly control high flow rates that occur with large hydraulic actuators.

SUMMARY OF THE INVENTION

A control valve includes a body that has primary bore into which a first port and a second port open, a valve seat located between the first and second ports, and a release passage in communication with the first port. A main poppet is moveably received within the primary bore to selectively engage and disengage the valve seat and defines a primary control chamber in the primary bore on a remote side of the main poppet from the valve seat. A passageway extends between the second port and the primary control chamber and includes a variable flow restriction that decreases in magnitude as the main poppet moves away from the valve seat.

An electrohydraulic pilot valve controls flow of fluid between the primary control chamber and the release passage, and has an inlet connected to the primary control chamber and an outlet connected to the release passage. The electrohydraulic pilot valve includes a pilot poppet which controls fluid flow from the inlet to the outlet in response to pressure in a pilot control chamber. An electrically operated sub-pilot valve selectively opens to produce a decrease in the pilot control chamber pressure, which thereby causes the pilot poppet to open a path between the inlet and the outlet.

In one version of the electrohydraulic pilot valve, a pilot passage extends in the pilot poppet between the pilot control chamber and the outlet; and the sub-pilot valve comprises a solenoid actuator and a pilot element operably coupled to be moved by the solenoid actuator, thereby selectively opening and closing the pilot passage.

In another aspect of the present invention, the pilot element selectively engages and disengages an opening of the pilot passage into the pilot control chamber. A pressure compensator is provided to vary the position of the opening with respect to the pilot poppet in response to a pressure differential between the pilot control chamber and the outlet.

In a bidirectional version of the control valve, a first inlet check valve provides a path for fluid to flow only from the first port into the passageway, and a second inlet check valve that permits fluid to flow only from the second port into the passageway. In addition, a first release check valve that permits fluid to flow only from the release passage into the first port, and a second release check valve provides a path for fluid to flow from the release passage into the second port.

Another version of the control valve that has a free flow mode. When the pressure differential across the valve has one polarity the flow through the valve can be controlled proportionally. The valve opens automatically when the pressure differential has the opposite polarity of at least a given magnitude thereby allowing free fluid flow.

Yet another version of the control valve that has a flow checking mode. This valve may be selectively opened when the pressure differential has one polarity and can not opened when the pressure differential has the opposite polarity.

DETAILED DESCRIPTION OF THE INVENTION

Figure 1:
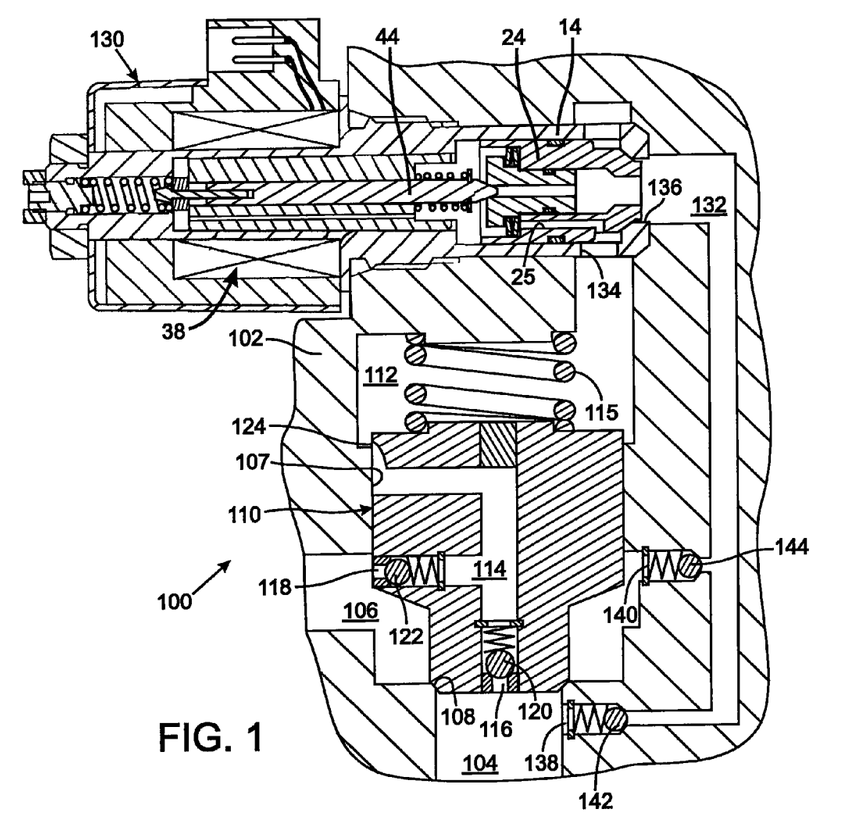
FIG. 1 is a cross section view through a bidirectional hydraulic control valve according to the present invention.

With initial reference to FIG. 1, a bidirectional control valve 100 has a body 102 with a first port 104 and a second port 106 opening into a primary bore 107. A valve seat 108 is located in between the first and second ports 104 and 106. A main poppet 110 is slidably received within the body 102 and selectively engages the valve seat 108 to close the fluid path between the first and second ports 104 and 106. The main poppet 110 can slide away from engagement with the valve seat 108 to open a flow path between the first and second ports 104 and 106. Movement of the main poppet, as will be described in greater detail herein, is determined by the main spring 115 and relationship of pressures in the first and second ports 104 and 106 and a primary control chamber 112 located on the remote side of the main poppet 110 from the valve seat 108.

The main poppet 110 has a passageway 114 with a first opening 116 into the first port 104 and a second opening 118 into the second port 106. A first inlet check valve 120 permits fluid to flow only from the first port 104 into the passageway 114 and a second inlet check valve 122 allows fluid to flow only from the second port 106 into the passageway 114. The poppet passageway 114 also has a third opening 124 a side wall of the main poppet 110 that is adjacent to the end which faces into the primary control chamber 112. That third opening 124 is tapered thereby forming a variable orifice which provides a variable flow restriction to fluid flowing from the passageway 114 into the primary control chamber 112 as the main poppet 110 slides in the body 102. Specifically, when the main poppet 110 is against the valve seat 108 as illustrated, a relatively small orifice is provided at the third opening 124 which increases in size, i.e., becomes less flow restrictive, as the main poppet 110 moves away from the valve seat 108.

An electrohydraulic pilot valve 130 controls the flow of fluid between the primary control chamber 112 and a release passage 132 in the valve body 102. In particular, the pilot valve 130 has an inlet 134 in fluid communication with the primary control chamber 112 and an outlet 136 in fluid communication with the release passage 132. The release passage 132 has a first release outlet 138 into the first port 104 and a second release outlet 140 into the second port 106. A first release check valve 142 allows fluid to flow only in a direction from the release passage 132 into the first port 104, and a second release check valve 144 permits fluid to flow only from the release passage 132 into the second port 106.

Figure 2:
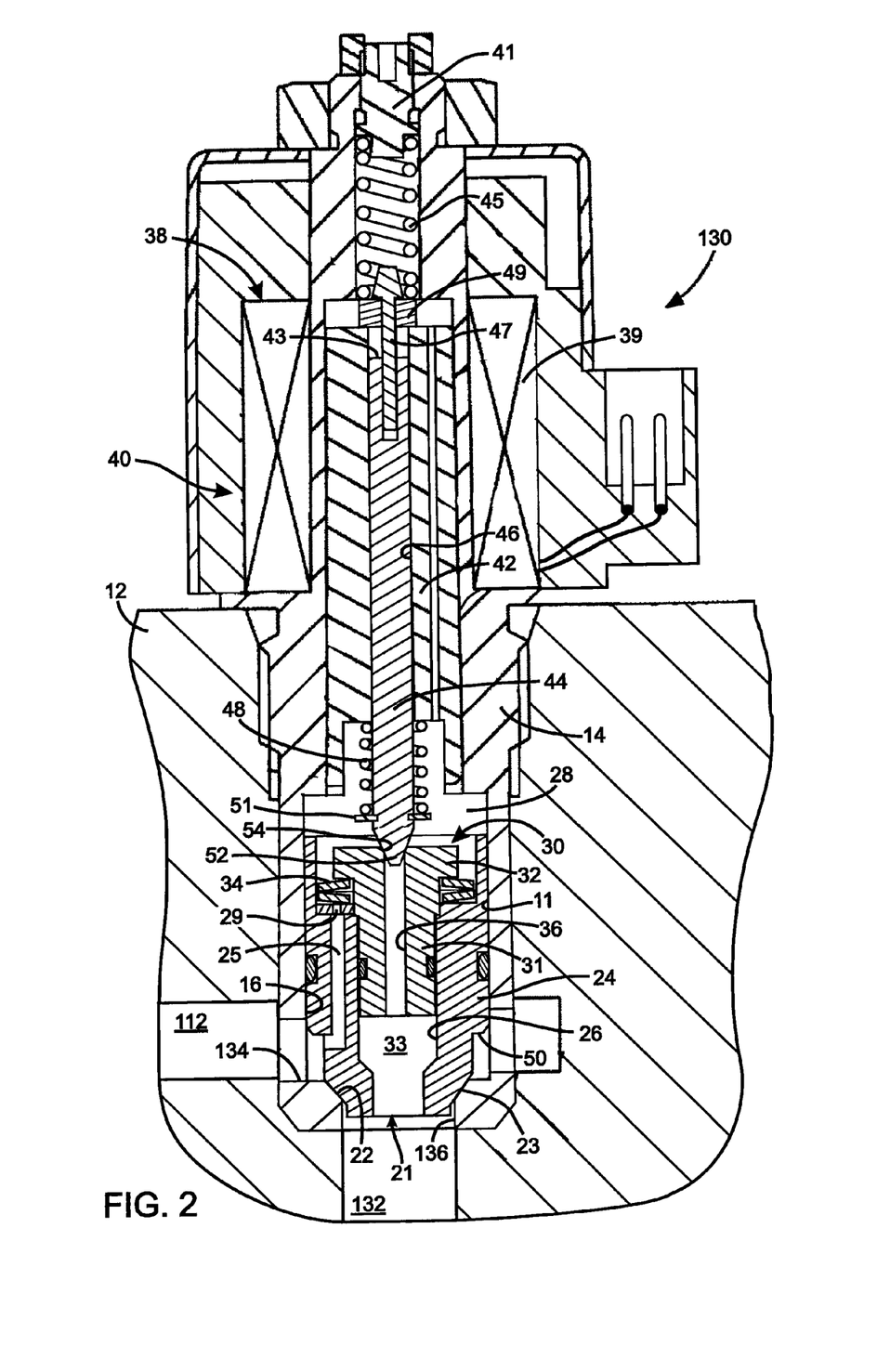
FIG. 2 is a cross section view through an electrohydraulic poppet pilot valve used in the hydraulic valve assembly.

Referring to FIG. 2, the electrohydraulic pilot valve 130 comprises a cylindrical valve sleeve 14 that is mounted in an aperture 11 of the valve body 12. The valve sleeve 14 has a longitudinal first bore 16 with the inlet 134 in the side of the valve sleeve and in communication with the primary control chamber 112. The outlet 136, located at one end of the valve sleeve 14, opens into the release passage 132. A pilot poppet seat 22 is formed in the first bore 16 between the inlet and outlet 134 and 136.

A pilot poppet 24 slides within the first bore 16 and engages and disengages the pilot poppet seat 22 to selectively control flow of hydraulic fluid between the inlet and outlet 134 and 136. For that purpose, the nose 21 of the pilot poppet 24 has a frustoconical surface 23 that in the closed state of the electrohydraulic pilot valve 130 abuts the pilot poppet seat 22. A control passage 25 links the inlet 134 to the pilot control chamber 28 and has a fixed size orifice 29 therein, which restricts fluid flow through that passage.

An aperture 26 is centrally located through the pilot poppet 24 extending from a pilot control chamber 28 to the outlet 136. Flow through that aperture 26 is controlled by an electrically operated sub-pilot valve 40 that comprises a solenoid actuator 38 and a pilot element 44. Preferably, the pilot element 44 engages a pressure compensator 30 that counteracts effects due to variation of the pressure differential across the electrohydraulic pilot valve 130. The pressure compensator 30 comprises a pilot piston 31 slideably received in the aperture 26 of the pilot poppet 24, thereby defining a pilot cavity 33 in fluid communication with the outlet 136. A pilot passage 36 extends through the pilot piston 31 between the pilot control chamber 28 and the pilot cavity 33 and has a pilot seat 54 at the opening into the pilot control chamber. The pilot element 44 engages and disengages the pilot seat 54 to selectively open and close the pilot passage, as will be described. The pilot piston 31 has an enlarged head 32 at the end facing the pilot control chamber 28 and a Belleville spring 34 is located around the pilot piston biasing the head 32 away from the pilot poppet 24. Opposite sides of the pilot piston 31 are exposed to the pressures in the pilot control chamber 28 and at the outlet 136. A greater pressure in the pilot control chamber 28 than in the outlet 136, tends to push the pilot piston 31 farther into the pilot poppet 24 and compress the Belleville spring 34. This motion of the pilot piston 31 with respect to the pilot poppet 24 changes the effective position of the pilot seat 54, thereby compensating for variation in the valve operation resulting from changes in the pressure differential across the pilot poppet.

Movement of the pilot poppet 24 is controlled by an actuator, such as a solenoid actuator 38 that comprises an electromagnetic coil 39 and an armature 42. The armature 42 is positioned within the first bore 16 through the valve sleeve 14 and is biased toward the pilot poppet 24 by a modulating spring 45 that exerts a force which can be varied by an adjusting screw 41 threaded into an exposed end of the first bore 16. The electromagnetic coil 39 is secured around the valve sleeve 14. The armature 42 slides within the first bore 16 away from pilot poppet 24 in response to a magnetic field created by applying electric current to the electromagnetic coil 39.

The rod-like pilot element 44 is slideably received in a second bore 46 in the tubular armature 42. A second spring 48 engages a snap ring 51 secured to the pilot element 44, biasing the pilot element 44 outward from that second bore 46, so that in a de-energized state of the solenoid actuator 38, a conical tip 52 of the pilot element enters the pilot passage 36. The conical tip 52 engages the pilot poppet at a pilot seat 54 formed where the pilot passage 36 opens into the pilot control chamber 28. A remote end 43 of the pilot element 44 is recessed within second bore 46 from the adjacent end of the armature 42 when the electrohydraulic pilot valve 130 is in the closed state as illustrated. That pilot element's remote end 43 has an aperture within which a pull pin 47 is press-fitted. The pull pin 47 has an exterior head that engages a washer 49 that is held between the end of the armature 42 and the modulating spring 45. A gap exists between the washer 49 and the adjacent end of the pilot element 44 that allows the pilot element to slide upward within the armature 42 and the modulating spring 45 against the force of the second spring 48 at the other end of the pilot element. The modulating spring 45 has a significantly greater spring rate than the second spring 48 so that force applied to the tip of the pilot element 44 will produce that sliding action before the armature 42 compresses the first spring.

In some applications of the control valve 100 a pressure compensated electrohydraulic pilot valve 130 is not required. In that case, the pilot piston 31 and the Belleville spring 34 are eliminated and the pilot passage 36 is formed directly in the pilot poppet 24 in place of the aperture 26. Here the pilot element 44 selectively engages the fixed opening of the pilot passage 36 in the pilot poppet 24.

With reference to both FIGS. 1 and 2, operation of the electrohydraulic pilot valve 130 controls pressure in the primary control chamber 112 and thus motion of the main poppet 110. Specifically, the pressure in the primary control chamber 112 is communicated through the pilot valve inlet 134 and the control passage 25 to the pilot control chamber 28 in FIG. 2. In the de-energized state of the electromagnetic coil 39, the modulating spring 45 forces the armature 42 toward the pilot poppet 24, while the second spring 48 forces the pilot element 44 outward from the armature also toward the pilot poppet. This combined action results in the pilot element's conical tip 52 closing the pilot passage 36 and blocking fluid communication between the pilot control chamber 28 and the outlet 136. As a consequence, pressure in the pilot control chamber 28 is not discharged through the release passage 132 and that trapped pressure forces the pilot poppet 24 against the pilot poppet seat 22 which blocks flow between the inlet and outlet of the electrohydraulic pilot valve 130. The pressure trapped in the pilot control chamber 28 resists forces that tend to move the pilot poppet 24 off the pilot poppet seat 22 and open the electrohydraulic pilot valve 130.

In the closed state of the electrohydraulic pilot valve 130, the greater pressure at either the first port 104 or the second port 106 in FIG. 1, is communicated into the main poppet passageway 114 through the first inlet check valve 120 or the second inlet check valve 122, respectively, and onward into the primary control chamber 112. Since this pressure cannot be conveyed through the electrohydraulic pilot valve 130, it forces the main poppet 110 against the main valve seat 108 closing the primary flow path between the first and second ports 104 and 106.

With reference to FIG. 2, energizing the solenoid actuator 38 of the electrohydraulic pilot valve 130 enables proportional control the flow of hydraulic fluid between the inlet and outlet 134 and 136. Electric current applied to the electromagnetic coil 39 generates a magnetic field that draws the armature 42 upward into the solenoid actuator 38 which action tows the pull pin 47 and the pilot element 44 upward. This movement pulls the pilot element 44 away from the pilot poppet 24, thereby opening the pilot passage 36, releasing the pressure in the pilot control chamber 28 through the outlet 136 into the release passage 132 in FIG. 1. That relatively high pressure then opens either the first or second release check valve 142 or 144 in the release passage 132, discharging pressure in the pilot control chamber 28 into whichever of the first or second port 104 or 106 is at the lower pressure. The fixed size orifice 29 in the control passage 25 restricts fluid from the primary control chamber 112 from quickly entering the pilot control chamber 28 and restoring the pressure therein.

When the opening between the pilot control chamber 28 and the pilot passage 36 in FIG. 2 reaches a predefined size, as determined by the static pressure areas of the pilot poppet 24, the pilot poppet 24 follows the pilot element 44 moving away from the pilot poppet seat 22. This motion also brings the tip 52 of the pilot element back into the pilot passage 36, thereby reducing the flow there through. When the pilot passage flow equals the flow through the fixed size orifice 29 of the control passage 25, an equilibrium condition exists and the pilot poppet 24 stops moving and maintains an open position. The magnitude electric current applied to the electromagnetic coil 39 determines a distance that the pilot element 44 travels and thus a distance that the pilot poppet 24 moves away from the pilot poppet seat 22. Therefore, selectively controlling the electric current proportionally controls the fluid flow though the electrohydraulic pilot valve 130.

Pressure fluctuations at the inlet 134 and the outlet 136 change the pressure differential across the electrohydraulic pilot valve 130 which without the pressure compensator 30 could alter the magnitude of electrical current required to operate the valve as desired. In the preferred version of the electrohydraulic pilot valve 130, the effect that variation of the pressure differential has on the pilot poppet 24 operation is counterbalanced by movement of the pilot seat 54 formed in the pilot piston. The Belleville spring 34 enables the pilot seat 54 to move with respect to the pilot poppet 24 in response to changes in the pressure differential across that poppet. Such movement effectively alters the axial position of the pilot seat 54 to offset the effects of pressure differential changes on the electrohydraulic pilot valve 130. This action compensates for the hydraulic imbalance on the pilot element 44 and the modulation spring force to actuator force balance.

With reference again to FIG. 1, when the electrohydraulic pilot valve 130 is closed, the pressure in the primary control chamber 112 is the same as the greater of the pressures at either the first or second port 104 or 106. At this time, the greater pressure opens the related first or second inlet check valve 120 or 122 conveying that pressure through the passageway 114 in the main poppet 110 into the primary control chamber 112. The other one of the first and second inlet check valves 120 and 122 and the electrohydraulic pilot valve 130 are now closed thereby holding the primary control chamber pressure. Thus pressure in the primary control chamber 112 will be at least as great as the greater pressure at the first and second port 104 and 106.

When electrohydraulic pilot valve 130 opens, the pressure in the control chamber decreases via the release passage 132 into whichever of the first or second port 104 or 106 is at a lower pressure. This creates a pressure differential across the main poppet 110, that forces the main poppet away from the valve seat 108, opening a flow path between the first and second ports 104 and 106. As that movement occurs, the tapered contour of the orifice formed by the third opening 124 increases the area through which fluid flows from the poppet passageway 114 in to the primary control chamber 112 thus reducing the amount of flow restriction to become less restrictive. The electrohydraulic pilot valve 130 proportionally controls the flow from the primary control chamber 112. When the flow through the poppet passageway's third opening 124 equals the flow through the electrohydraulic pilot valve, the main poppet 110 stops moving away from the valve seat 108. The distance that the main poppet 110 is now from the valve seat and the pressure differential determines the flow rate through the bidirectional control valve 100.

Therefore, the electrohydraulic pilot valve 130 is used to proportionally control, or modulate, the rate at which fluid is released from the primary control chamber 112 and thus the distance that the main poppet 110 moves away from its valve seat 108. This in turn controls the flow rate through the bidirectional control valve 100. Use of an electrohydraulic pilot operated poppet valve as the electrohydraulic pilot valve 130 enables relatively fast control of the separate main poppet 110 that governs high flow rates through the control valve 100.

Some hydraulic systems do not require the bi-directional flow control provided by the first control valve shown in the FIG. 1. For example, it may be advantageous to provide control that positions the poppet when the pressure differential across the valve has only one polarity. When the pressure differential has the opposite polarity, the control valve opens automatically, which is referred to as a "free flow" mode. The "free flow" mode is often desirable in a fluid path between a hydraulic consumer and a tank return line, so that the control valve automatically opens when pressure in the tank return line is greater pressure than at the hydraulic consumer, thereby reducing the likelihood of cavitation in the consumer. The free flow mode is implemented by removing the second inlet check valve 122 and closing both the first opening 116 of passageway 114 and the second release outlet 140, which leaves just the first release check valve 142.

Figure 3:
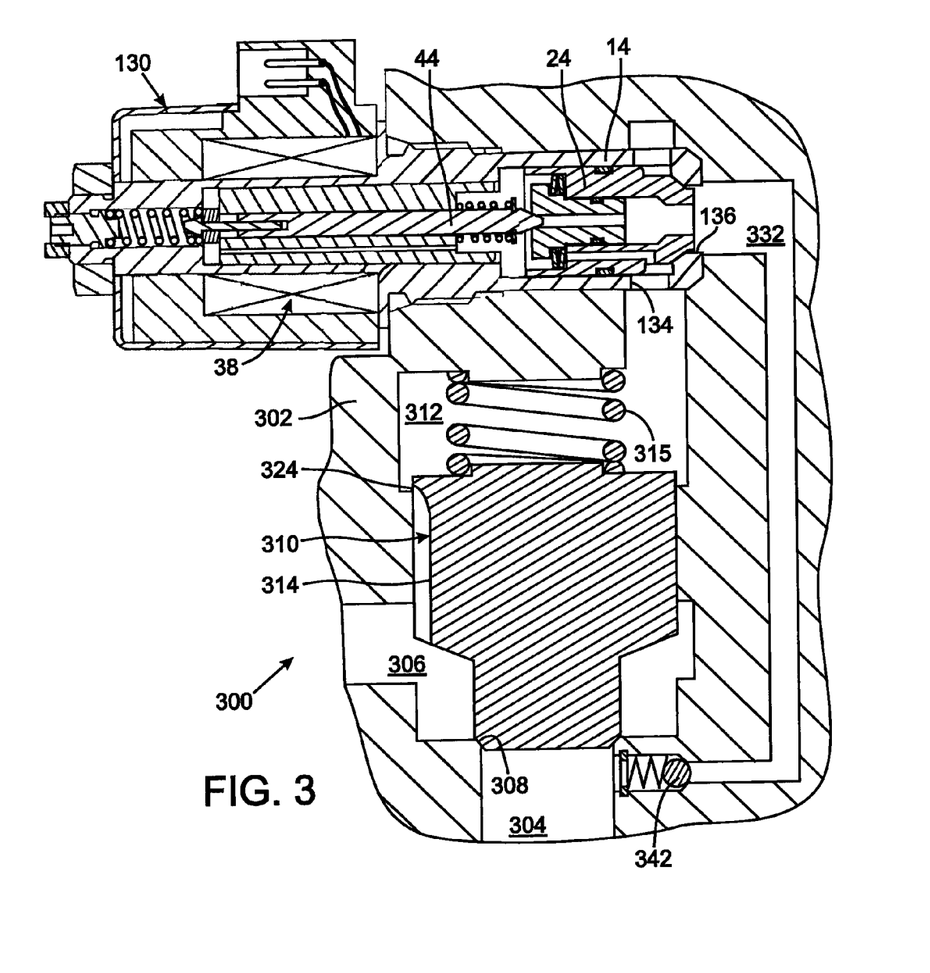
FIG. 3 is a cross section view through a unidirectional hydraulic control valve with a free flow mode.

This modification creates a second control valve 300 shown in FIG. 3 in which a body 302 has first and second ports 304 and 306 with a valve seat 308 there between. A main poppet 310 selectively engages the valve seat 308 to control fluid flow between the first and second ports. Movement of the main poppet 310 is controlled by pressure within the primary control chamber 312. The main poppet 310 has a passageway 314 extending from the second port 306 to a tapered opening 324 into the primary control chamber 312. The tapered opening 324 provides a variable restriction to fluid flowing from the passageway into the primary control chamber. That flow restriction diminishes as the main poppet 310 moves away the valve seat 308 thereby becoming less restrictive so that the amount of flow increases.

An electrohydraulic pilot valve 130, for example of the type shown in FIG. 2, controls the flow of fluid between the primary control chamber 312 and a release passage 332 leading to the first port 304. A release check valve 342 allows fluid to flow through the release passage 332 only in a direction from electrohydraulic pilot valve 130 to the first port 304.

When pressure in the second port 306 is greater than the pressure at the first port 304, the second control valve 300 modulates the fluid flow in the same manner as described above which respect to the bidirectional first control valve 100. In this situation, the pressure in the second port 306 is conveyed through the passageway 314 and into the primary control chamber 312. That pressure in the primary control chamber 312 holds the main poppet 310 closed against the valve seat 308. To open the second control valve 300, the electrohydraulic pilot valve 130 is opened thereby providing a path through the release passage 332 which decreases the pressure in the primary control chamber 312. Because of the variable orifice provided by the tapered opening 324 of passageway 314, the primary control chamber 312 now has a lower pressure than the second port 306. Thus the greater pressure at the second port 306 forces the main poppet 310 away from the valve seat 308 and opening a primary flow path between the two ports 304 and 306.

Thereafter, closing the electrohydraulic pilot valve 130 results in pressure in the primary control chamber 312 increasing to the level at the second port 306. As a consequence, the hydraulic force and the force from spring 315 are able to move the main poppet 310 against the valve seat 308 closing the primary flow path between the first and second ports 304 and 306.

In another situation, when the pressure in the first port 304 is greater than in the second port 306, the second control valve 300 automatically opens regardless whether electric current is being applied to solenoid actuator 38. Now, the pressure in the first port 304 exerts a force on the nose of the main poppet 310 that overcomes the counter forces from the pressure in the primary control chamber 312 and the spring 315 and moves the main poppet 310 away from valve seat 308. That motion forces fluid in the primary control chamber 312 through the tapered opening 324 and the passageway 314 to the second port 306. This action is referred to as the free flow mode.

The polarities of the pressure differential at which the free flow and flow modulation modes occur can be reversed by reversing the ports 304 and 306 into which the passageway 314 and the release passage 332 open.

In other hydraulic systems, it is desirable to permit the main poppet to open only when the pressure differential has a given polarity. When the opposite pressure polarity exists, the valve closes regardless of the activation state of the solenoid actuator. This is referred to as a "flow checking" mode and is often used in a pump outlet to hydraulic consumer path where flow should be restricted to a direction to the consumer from the pump and not from the consumer to the pump.

Figure 4:
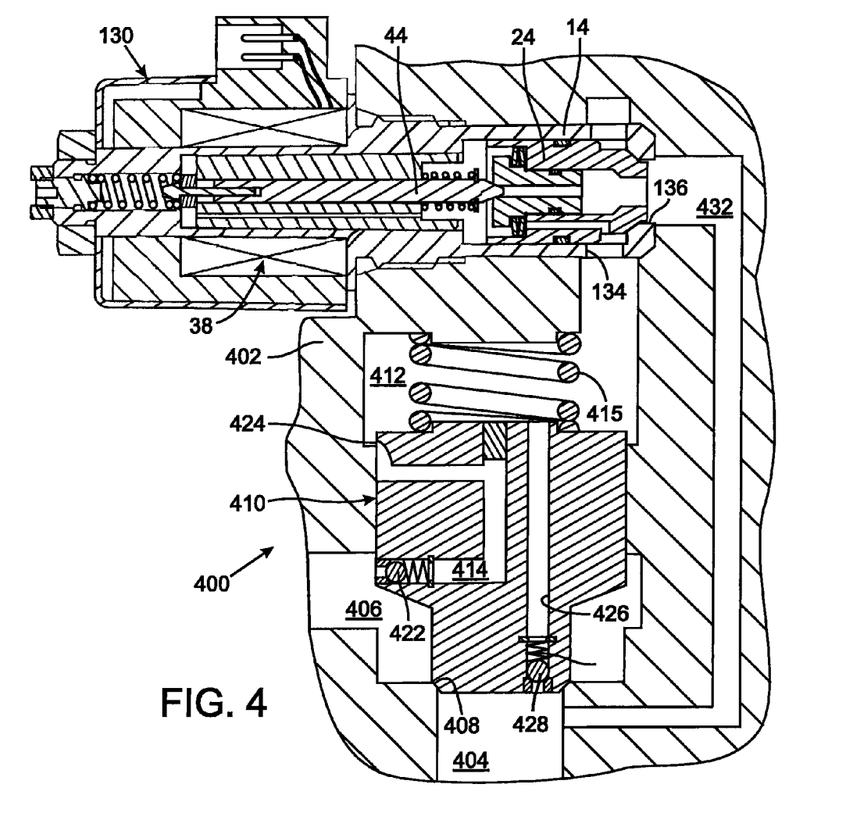
FIG. 4 is a cross section view through a unidirectional hydraulic control valve with a flow checking mode.

FIG. 4 depicts a third control valve 400 that has the flow checking mode. This control valve has a body 402 with first and second ports 404 and 406 between which there is a valve seat 408. A main poppet 410 selectively engages the valve seat 408 to control fluid flow between the first and second ports. Movement of the main poppet 410 is controlled by pressure within the primary control chamber 412. The main poppet 410 has a first passage extending from the second port 406 to a tapered opening 424 into the primary control chamber 412. The tapered opening 424 forms a variable orifice that provides a variable flow restriction to fluid traveling from a first passageway 414 into the primary control chamber 412. That flow restriction diminishes, i.e. becomes less restrictive, as the main poppet 410 moves farther from the valve seat 408. A first check valve 422 is located in the first passageway 414 and contributes to the flow checking function by allowing fluid to flow only from the second port 406 to the primary control chamber 412. A second passageway 426 extends through the main poppet 410 between the primary control chamber and the first port 404. A second check valve 428 allows fluid to flow through the second passageway 426 only from the first port 404 to the primary control chamber 412.

An electrohydraulic pilot valve 130, of the type shown in FIG. 2 for example, controls the flow of fluid between the primary control chamber 412 and a release passage 432. The release passage 432 provides an unrestricted flow path from the electrohydraulic pilot valve 130 to the first port 404.

With the third control valve 400, when the pressure in the first port 404 is greater than at the second port 406, the main poppet 410 remains closed, under foreseeable pressure levels, regardless of the operating state of the solenoid actuator 38. At such times, the high pressure at the first port 404 is conveyed through the second check valve 428 into the primary control chamber 412 where it is trapped due to the closed state of the first check valve 422. Since the pressure in the primary control chamber 412 is the same as that in the first port 404, the additional force provided by the main spring 415 holds the main poppet 410 against the valve seat 408.

When the pressure in the second port 406 is greater than at the first port 404, operation of the electrohydraulic pilot valve 130 causes the third control valve 400 to function in the same manner as described for that pressure condition of the first control valve 100. That is the third control valve 400 is modulated by the level of the electric current applied to the solenoid actuator 38.

The polarities of the pressure differential at which the free flow and flow modulation modes occur can be reversed by reversing the ports 404 and 406 into which the passageway 414 and the release passage 432 open.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A control valve for controlling flow of fluid comprising:
a body having primary bore into which a first port and a second port open, and a valve seat between the first and second ports;
a release passage in communication with the first port;
a main poppet moveably received within the primary bore to selectively engage and disengage the valve seat and defining a primary control chamber in the primary bore on a remote side of the main poppet from the valve seat,
a first passageway extending between the second port and the primary control chamber and including a variable flow restriction which becomes less restrictive as the main poppet moves away from the valve seat; and
an electrohydraulic pilot valve controlling flow of fluid between the primary control chamber and the release passage, and comprising an inlet coupled to the primary control chamber, an outlet coupled to the release passage, a pilot poppet controlling flow of fluid between the inlet and the outlet in response to pressure in a pilot control chamber, and an electrically operated sub-pilot valve selectively controlling pressure in the pilot control chamber which pressure causes to operate the pilot poppet to move and thereby open and close a path between the inlet and the outlet.

2. The control valve as recited in claim 1 wherein the first passageway is formed in the main poppet.

3. The control valve as recited in claim 1 wherein the variable flow restriction of the first passageway comprises an orifice that increases in size as the main poppet moves away from the valve seat.

4. The control valve as recited in claim 1 wherein the electrohydraulic pilot valve further comprises a control passage extending between the inlet and the pilot control chamber.

5. The control valve as recited in claim 4 wherein the control passage is formed in the pilot poppet.

6. The control valve as recited in claim 4 wherein the control passage includes a fixed size orifice.

7. The control valve as recited in claim 1 wherein the electrohydraulic pilot valve further comprises a pressure compensator that responds to variation of a pressure differential between the pilot control chamber and the outlet by altering control of the pressure in the pilot control chamber by the sub-pilot valve.

8. The control valve as recited in claim 1 wherein the electrohydraulic pilot valve further comprises a pilot passage extending in the pilot poppet between the pilot control chamber and the outlet; and the sub-pilot valve comprises a solenoid actuator and a pilot element operably coupled to be moved by the solenoid actuator thereby selectively opening and closing the pilot passage.

9. The control valve as recited in claim 8 wherein the pilot passage has a pilot seat that is selectively engaged and disengaged by the pilot element; and
further comprising a pressure compensator that, in response to a pressure differential between the pilot control chamber and the outlet, varies a position of the pilot seat with respect to the pilot poppet.

10. The control valve as recited in claim 1 further comprising:
a first inlet check valve that provides a path through which fluid flows only from the first port into the first passageway;
a second inlet check valve that prevents fluid from flowing through the first passageway from the primary control chamber into the second port;
a first release check valve that prevents fluid from flowing through the release passage from the first port to the electrohydraulic pilot valve; and
a second release check valve that provides another path through which fluid flows only from the release passage into the second port.

11. The control valve as recited in claim 1 further comprising a release check valve that prevents fluid from flowing through the release passage from the first port to the electrohydraulic pilot valve.

12. The control valve as recited in claim 1 further comprising:
a first check valve that prevents fluid from flowing through the first passageway from the primary control chamber into the second port
a second passageway extending between the first port and the primary control chamber; and
a second check valve that prevents fluid from flowing through the second passageway from the primary control chamber into the first port.

13. A control valve for controlling flow of fluid comprising:
a body having primary bore into which a first port and a second port open, a valve seat between the first and second ports, and a release passage in communication with the first port;
a main poppet moveably received within the primary bore to selectively engage and disengage the valve seat and defining a primary control chamber in the primary bore on a remote side of the main poppet from the valve seat, the main poppet defining a first passageway extending between the second port and the primary control chamber wherein the first passageway has a variable flow restriction which becomes less restrictive as the main poppet moves away from the valve seat; and
an electrohydraulic pilot valve comprising an inlet connected to the primary control chamber, an outlet connected to the release passage, and a pilot poppet controlling flow of fluid between the inlet and the outlet in response to pressure in a pilot control chamber defined at one external end of the pilot poppet, the pilot poppet having a control passage extending between the inlet and the pilot control chamber and having a pilot passage extending between the pilot control chamber and the outlet, and the electrohydraulic pilot valve further including a solenoid actuator and a pilot element coupled to the solenoid actuator and selectively opening and closing the pilot passage.

14. The control valve as recited in claim 13 wherein the variable flow restriction of the first passageway comprises an orifice that increases in size as the main poppet moves away from the valve seat.

15. The control valve as recited in claim 13 wherein the electrohydraulic pilot valve further comprises a pressure compensator that responds to variation of a pressure differential between the pilot control chamber and the outlet by altering operation of the pilot element to selectively open and close the pilot passage.

16. The control valve as recited in claim 13 wherein the pilot passage has a pilot seat that is selectively engaged and disengaged by the pilot element; and
further comprising a pressure compensator that varies a position of the pilot seat with respect to the pilot poppet in response to a pressure differential between the pilot control chamber and the outlet.

17. The control valve as recited in claim 13 further comprising:
a first inlet check valve that provides a path through which fluid flows only from the first port into the first passageway;
a second inlet check valve that prevents fluid from flowing through the first passageway from the primary control chamber into the second port;
a first release check valve that prevents fluid from flowing through the release passage from the first port to the electrohydraulic pilot valve; and
a second release check valve that provides another path through which fluid flows only from the release passage into the second port.

18. The control valve as recited in claim 13 further comprising a release check valve that prevents fluid from flowing through the release passage from the first port to the electrohydraulic pilot valve.

19. The control valve as recited in claim 13 further comprising:
a first check valve that prevents fluid from flowing through the first passageway from the primary control chamber into the second port
a second passageway extending between the first port and the primary control chamber; and
a second check valve that prevents fluid from flowing through the second passageway from the primary control chamber into the first port.

20. A control valve comprising:
a body having primary bore into which a first port and a second port open, a valve seat between the first and second ports, and a release passage in communication with the first port;
a main poppet moveably received within the primary bore to selectively engage and disengage the valve seat and defining a primary control chamber in the primary bore on a remote side of the main poppet from the valve seat;
a first passageway extending between the second port and the primary control chamber and including a variable flow restriction which becomes less restrictive as the main poppet moves away from the valve seat; and
an electrohydraulic pilot valve controlling flow of fluid between the primary control chamber and the release passage, and comprising an inlet communicating with the primary control chamber, an outlet communicating with the release passage, a pilot poppet controlling flow of fluid between the inlet and the outlet in response to pressure in a pilot control chamber, and an electrically operated sub-pilot valve selectively controlling pressure in the pilot control chamber which pressure causes the pilot poppet to move and thereby open and close a flow path between the inlet and the outlet, the electrohydraulic pilot valve further comprising a pressure compensator that responds to variation of a pressure differential between the pilot control chamber and the outlet by altering control of the pressure in the pilot control chamber by the sub-pilot valve.

21. The control valve as recited in claim 20 wherein:
the pilot poppet comprises a control passage extending between the inlet and the pilot control chamber and a pilot passage extending between the pilot control chamber and the outlet and having a pilot seat; and
the sub-pilot valve has a pilot element that selectively engages and disengages the pilot seat to close and open the pilot passage;
wherein the pressure compensator varies a position of the pilot seat with respect to the pilot poppet in response to the pressure differential between the pilot control chamber and the outlet.

22. The control valve as recited in claim 20 further comprising:
a first inlet check valve that provides a first path through which fluid flows only from the first port into the first passageway;
a second inlet check valve that prevents fluid from flowing through the first passageway from the primary control chamber into the second port;
a first release check valve that prevents fluid from flowing through the release passage from the first port to the electrohydraulic pilot valve; and
a second release check valve that provides a second path through which fluid flows only from the release passage into the second port.

23. The control valve as recited in claim 20 further comprising a release check valve that prevents fluid from flowing through the release passage from the first port to the electrohydraulic pilot valve.

24. The control valve as recited in claim 20 further comprising:
a first check valve that prevents fluid from flowing through the first passageway from the primary control chamber into the second port
a second passageway extending between the first port and the primary control chamber; and
a second check valve that prevents fluid from flowing through the second passageway from the primary control chamber into the first port.

* * * * *